United States Patent
Matsuo et al.

(10) Patent No.: US 9,487,076 B2
(45) Date of Patent: Nov. 8, 2016

(54) VEHICLE COOLING STRUCTURE

(71) Applicant: HONDA MOTOR CO., LTD., Tokyo (JP)

(72) Inventors: Hisashi Matsuo, Wako (JP); Sho Koyano, Wako (JP); Yoji Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/708,730

(22) Filed: May 11, 2015

(65) Prior Publication Data
US 2015/0328979 A1 Nov. 19, 2015

(30) Foreign Application Priority Data
May 19, 2014 (JP) ................. 2014-103300

(51) Int. Cl.
*B60K 11/04* (2006.01)
*B62J 17/00* (2006.01)
*B60K 11/08* (2006.01)

(52) U.S. Cl.
CPC ............. *B60K 11/04* (2013.01); *B62J 17/00* (2013.01); *B60K 11/08* (2013.01); *B60Y 2200/12* (2013.01)

(58) Field of Classification Search
CPC ..................... B60K 11/04; B60K 11/08
See application file for complete search history.

(56) References Cited

U.S. PATENT DOCUMENTS

| | | | | |
|---|---|---|---|---|
| 2,576,316 A * | 11/1951 | Toth | ...... | B60K 11/04 180/68.4 |
| 2,674,175 A * | 4/1954 | Backe | ...... | B60H 1/247 237/12.3 A |
| 4,562,895 A * | 1/1986 | Kirchweger | ...... | B60K 11/08 123/198 E |
| 4,610,326 A * | 9/1986 | Kirchweger | ...... | B60K 11/08 123/41.62 |
| 5,078,223 A * | 1/1992 | Ishiwatari | ...... | B62D 21/183 123/41.49 |
| 6,192,838 B1 * | 2/2001 | Matsuo | ...... | B60K 11/08 123/41.01 |
| 7,506,680 B1 * | 3/2009 | Castillo | ...... | F28D 7/024 123/41.49 |
| 2006/0211364 A1* | 9/2006 | Brotz | ...... | B60K 11/08 454/261 |
| 2008/0099261 A1* | 5/2008 | Sturmon | ...... | B60K 11/08 180/68.1 |
| 2011/0073288 A1* | 3/2011 | Hirukawa | ...... | B60K 11/08 165/104.34 |
| 2013/0065148 A1* | 3/2013 | Kim | ...... | H01M 8/04029 429/436 |
| 2014/0060947 A1* | 3/2014 | Braun | ...... | B60K 11/00 180/69.22 |
| 2014/0291052 A1* | 10/2014 | Kaita | ...... | B60K 11/08 180/229 |
| 2015/0151628 A1* | 6/2015 | Sakai | ...... | E02F 3/764 180/68.1 |

FOREIGN PATENT DOCUMENTS

JP 2005-059807 A 3/2005

* cited by examiner

*Primary Examiner* — Kevin Hurley
*Assistant Examiner* — Gabriela C Craciun
(74) *Attorney, Agent, or Firm* — Birch, Stewart, Kolasch & Birch, LLP

(57) ABSTRACT

A technique for increasing the capacity of air passing through a radiator main body, in a vehicle having a radiator. A vehicle includes a radiator main body for cooling a refrigerant introduced from an engine main body with a fan for conveying air to the vicinity of the radiator main body. A baffle member capable of sucking air from or blowing air into the radiator main body is attached to the radiator main body. A connecting duct for conveying air to the baffle member from the fan is provided between the baffle member and said fan.

14 Claims, 9 Drawing Sheets

VEHICLE COOLING STRUCTURE

CROSS-REFERENCE TO RELATED APPLICATIONS

The present application claims priority under 35 USC 119 to Japanese Patent Application No. 2014-103300 filed May 19, 2014 the entire contents of which are hereby incorporated by reference.

BACKGROUND OF THE INVENTION

1. Field of the Invention

The present invention relates to an improvement in a vehicle cooling structure including a heat exchanger.

2. Description of Background Art

A vehicle cooling structure is known that includes a heat exchanger and a fan conveying air to the heat exchanger. See, for example, Japanese Patent Application Publication No. 2005-059807.

As shown in FIG. 3 of Japanese Patent Application Publication No. 2005-059807, a vehicle air conditioner has a connecting duct (12) (the bracketed number indicates a reference numeral used in Japanese Patent Application Publication No. 2005-059807, and the same shall apply hereinafter) including an air intake, and a heat exchanger (15) for cooling connected to the downstream end of the connecting duct (12). A curved portion (17) having a curved surface shape is formed in the connecting duct (12).

In the technique of Japanese Patent Application Publication No. 2005-059807, air is conveyed along the curved surface of the curved portion (17) formed into the curved surface shape. At this time, stripping of air inside the curve is prevented by the Coandă effect, so that increase in ventilation resistance can be suppressed, and air flow speed distribution in the heat exchanger can be homogenized. Here, the Coandă effect refers to a phenomenon where a jet flow is attracted to a nearby wall.

When considering a case of replacing the heat exchanger with a radiator main body in the technique of Japanese Patent Application Publication No. 2005-059807, the technique disclosed in Japanese Patent Application Publication No. 2005-059807 is capable of suppressing an increase in the ventilation resistance by the Coandă effect and homogenizing air flow speed distribution in the heat exchanger. However, the amount of air (capacity of air) passing through the radiator does not change. There is a need for a technique that can increase the capacity of air passing through a radiator main body, in a vehicle having a radiator.

SUMMARY AND OBJECTS OF THE INVENTION

An objective of an embodiment of the present invention is to provide a technique that can increase the capacity of air passing through a radiator main body, in a vehicle having a radiator.

According to an embodiment of the present invention, a vehicle cooling structure includes a radiator main body for cooling a refrigerant introduced from an engine main body; and a fan for conveying air to the vicinity of the radiator main body, wherein a baffle member, which has a curved surface and is capable of sucking air from or blowing air into the radiator main body, is attached to the radiator main body with a connecting duct for conveying air to the baffle member from the fan being provided between the baffle member and the fan. The baffle member is a nozzle that includes an inner passage attached to the connecting duct and receiving air generated by the fan, as well as an exhaust nozzle from which air inside the inner passage is ejected. The nozzle is provided in any of a U-shape and an annular shape formed around an axis, which is parallel to a direction in which the air stream passing through the radiator main body flows. An air passage, which allows jet flow to flow therethrough while attracting surrounding air, is formed inside the nozzle.

According to an embodiment of the present invention, the nozzle has a U-shaped portion with a connecting plate is bridged across left and right upper ends of the U-shaped portion. The connecting plate is arranged in such a manner as to be at least partially inclined, so that an opening area of the air passage spreads toward the downstream from the windward side.

According to an embodiment of the present invention, the exhaust nozzle is configured of an inner wall, and an outer wall, which is provided outside the inner wall with respect to the shaft center of the air passage so as to be substantially parallel to the inner wall. An angle formed by the outer wall and an axis of the air stream flowing through the air passage is an acute angle.

According to an embodiment of the present invention, the inner wall and the outer wall are arranged so as to overlap each other when viewed from the axial direction of the air passage. An angle formed by the axis of the air passage and a line, which connects the tip end of the inner wall and the tip end of the outer wall, is set not smaller than 60° and not larger than 90°.

According to an embodiment of the present invention, the inner diameter of the air passage is longer than 90 mm.

According to an embodiment of the present invention, the vehicle is a straddle type vehicle. The straddle type vehicle includes a frame member and a cowl member covering the frame member with the fan being arranged between the frame member and the cowl member.

According to an embodiment of the present invention, the connecting duct for conveying air to the baffle member from the fan is provided between the baffle member and the fan. The connecting duct allows the radiator main body and the fan to be arranged separately.

Conventionally, in a structure including a fan arranged close to a radiator main body, air passing through the radiator main body hits the fan blade and does not pass through smoothly, whereby the cooling efficiency is reduced. This requires measures such as enlargement of the fan, in some cases.

Thus, in an embodiment of the present invention, the radiator main body and the fan are arranged separately. With this configuration, air passing through the radiator main body does not hit the fan blade but passes thorough smoothly, so that a reduction in the cooling efficiency can be suppressed. Since air passes through smoothly and a reduction in the cooling efficiency is suppressed, the fan can be made smaller. In addition, since the fan can be arranged separately from the radiator main body, the arrangement can be designed more freely.

In addition, the baffle member for sucking air from or blowing air into the radiator main body is attached to the radiator main body. The capacity of air passing through the radiator main body can by increased, by attaching the baffle member having the Coandă effect to the radiator main body.

Further, the nozzle has the inner passage and the exhaust nozzle, and the air passage is formed inside the exhaust nozzle. The nozzle has the Coandă effect, and air ejected from the exhaust nozzle draws in surrounding air having passed through the air passage. Thus, the capacity of air passing through the air passage can be increased by the Coandă effect. As a result, the capacity of air passing through the radiator main body can be increased by use of the nozzle having a simple shape.

According to an embodiment of the present invention, the nozzle has the U-shaped portion, the connecting plate is bridged across left and right upper ends of the U-shaped portion, and the connecting plate is arranged in such a manner as to be at least partially inclined, so that the opening area of the air passage spreads toward the downstream from the windward side. Since air flowing through the air passage is guided by the connecting plate, air having passed through the air passage is allowed to flow efficiently without being diffused, as compared to a case where the connecting plate is not provided.

According to an embodiment of the present invention, the exhaust nozzle is configured of the inner wall and the outer wall, the inner wall and the outer wall are provided substantially parallel to each other with the angle formed by the axis of the air stream and the outer wall being an acute angle. If the angle formed by the axial direction of the air stream and the outer wall is an acute angle, air flowing through the air passage is allowed to flow efficiently without being diffused.

According to an embodiment of the present invention, the angle formed by the axis of the air stream and the line, which connects the tip end of the inner wall and the tip end of the outer wall, is not smaller than 60° and not larger than 90°.

If the angle is set smaller than 60° or larger than 90°, the effect of attracting air flowing through the air passage is weakened. More specifically, the Coandă effect cannot be fully exerted.

Thus, in an embodiment of the present invention, the angle formed by the axis of the air stream and the line, which connects the tip end of the inner wall and the tip end of the outer wall, is set not smaller than 60° and not larger than 90°. Thus, air passing through the air passage is allowed to flow more efficiently while attracting air passing through the air passage.

According to an embodiment of the present invention, the inner diameter of the air passage is longer than 90 mm.

If the inner diameter of the air passage is set not longer than 90 mm, the inner diameter of the air passage becomes too short, and air streams passing through the air passage may interfere with one another.

Thus, in an embodiment of the present invention, the inner diameter of the air passage is longer than 90 mm, so that air streams passing through the air passage are allowed to flow efficiently without interfering with one another.

According to an embodiment of the present invention, in a straddle type vehicle, the space for arranging parts is limited as compared to a four-wheeled vehicle or the like, for example.

In an embodiment of the present invention, the fan is arranged between the frame member and the cowl member in the straddle type vehicle having limited arrangement space. Thus, the limited space can be utilized effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
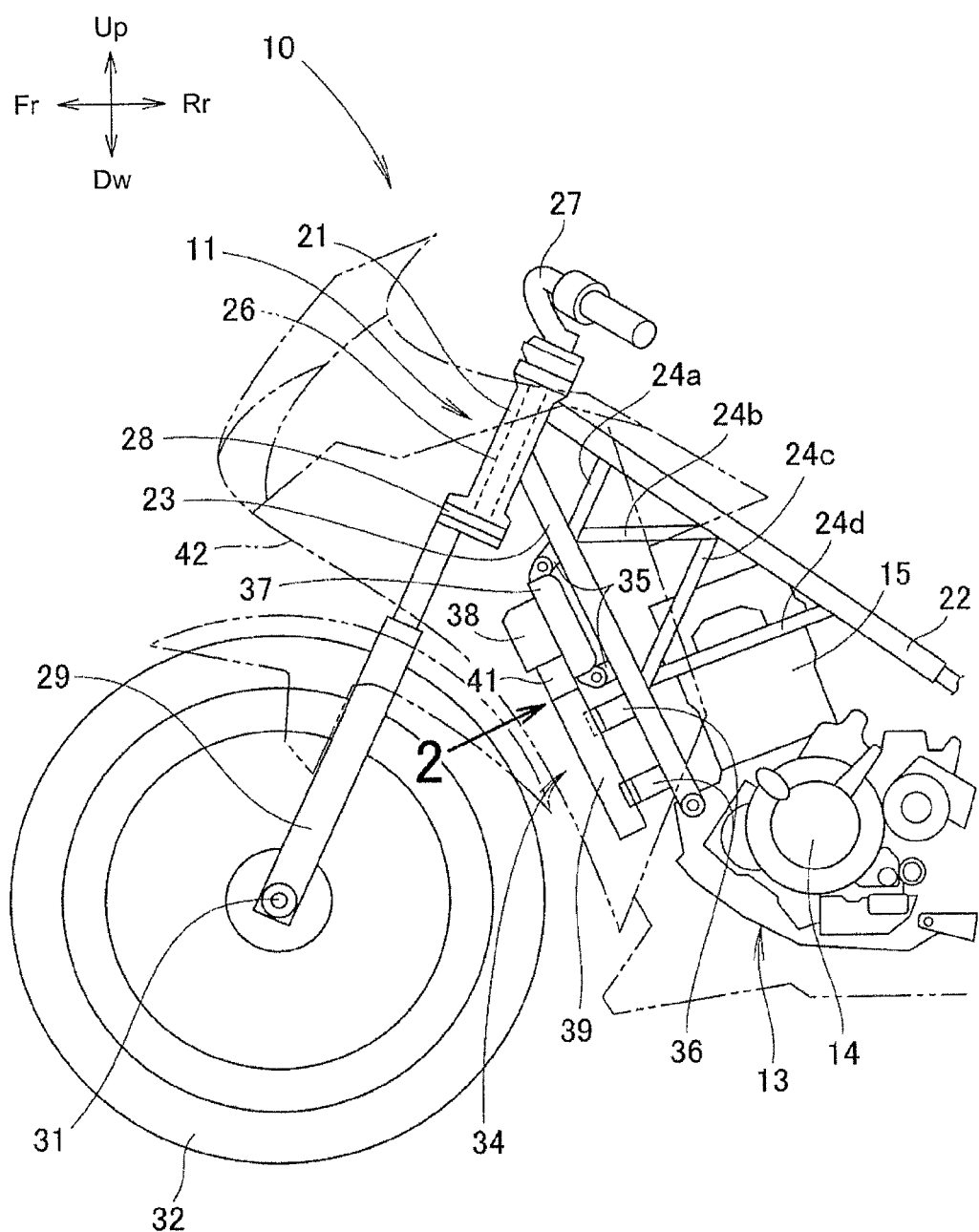
FIG. 1 is a left side view of a front portion of a motorcycle, which includes a radiator according to the present invention.

Hereinafter, an embodiment of the present invention will be described in detail. In the drawings and examples, each of "upper," "lower," "front," "rear," "left," and "right" refers to a direction seen from a rider on a motorcycle.

As shown in FIG. 1, a motorcycle 10 has a frame member 11 with an engine main body 13 as a drive source being suspended from the frame member 11. The engine main body 13 has a crankcase 14 with a cylinder portion 15 attached to an upper face of the crankcase 14 and extending upwardly.

The frame member 11 has a head pipe 21, a main frame 22 extending obliquely downwardly in a rearward direction of the vehicle from the head pipe 21, a down frame 23 extending obliquely downwardly in the rearward direction of the vehicle from the head pipe 21 below the main frame 22, and multiple reinforcement frames 24a to 24d bridged across the main frame 22 and the down frame 23.

A steering shaft 26 is rotatably inserted into the head pipe 21, a steering handle 27 is attached to the upper end of the steering shaft 26, a bridge member 28 is attached to the lower end of the steering shaft 26, a front fork 29 extends obliquely downwardly in the front direction of the vehicle from the bridge member 28, a front wheel axle 31 is bridged across the lower ends of the front fork 29, and a front wheel 32 is rotatably attached to the front wheel axle 31. The motorcycle 10 is a straddle type vehicle, which a rider rides by straddling the vehicle rear of the steering handle 27.

A cooling device 34 for cooling a refrigerant introduced from the engine main body 13 is attached to the down frame 23, at the vehicle front of the cylinder portion 15. The cooling device 34 is attached to the down frame 23 through radiator stays 35, 35, and includes as main elements a radiator main body 37 for cooling the refrigerant introduced from the engine main body 13, a baffle member 38 attached to the front of the radiator main body 37, a fan 39 attached to the down frame 23 through baffle stays 36, 36 below the baffle member 38, and a connecting duct 41 provided between the fan 39 and the baffle member 38 and conveying air to the baffle member 38 from the fan 39. The frame member 11 and the cooling device 34 are covered with a cowl member 42. The fan 39 of the cooling device 34 is arranged between the frame member 11 and the cowl member 42.

The fan 39 has a function of sucking in and pressurizing surrounding air. The baffle member 38 has a function of blowing out the air pressurized by the fan 39 and increasing the capacity of air passing through the radiator main body 37.

Next, the structure of the cooling device will be described in detail with reference to FIGS. 2 to 4.

Figure 2:
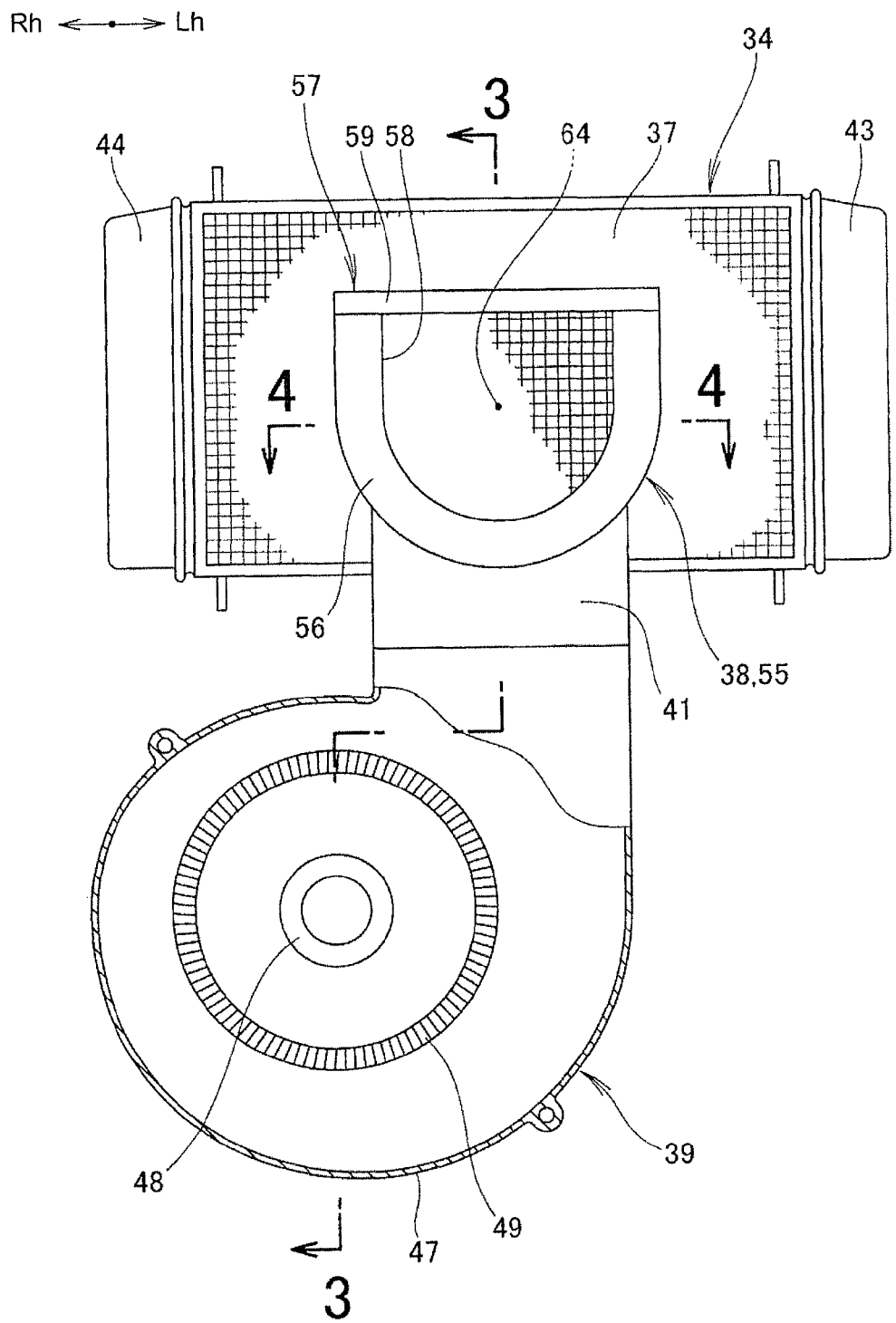
FIG. 2 is a view on arrow 2 of FIG. 1.

As shown in FIG. 2, the cooling device 34 is configured of the radiator main body 37, the baffle member 38 attached to the radiator main body 37 at the substantial center thereof in the vehicle width direction and the substantial center thereof in the height direction, and the fan 39 attached to the lower end of the baffle member 38 through the connecting duct 41. The baffle member 38 is configured to blow air pressurized by the fan 39 onto the radiator main body 37. The baffle member 38 has a U-shaped portion 56 and a connecting plate 57 bridged across the upper ends of the U-shaped portion 56. An air passage 58 that allows air to flow into the radiator main body 37 is formed in a region surrounded by the U-shaped portion 56 and the connecting plate 57.

In front view of the vehicle, the baffle member 38 is provided in a position where it overlaps with the radiator main body 37, while the fan 39 is provided in a position where it does not overlap with the radiator main body 37. Note that the radiator main body 37 includes radiator tanks 43, 44 on left and right end portions thereof.

Figure 3:
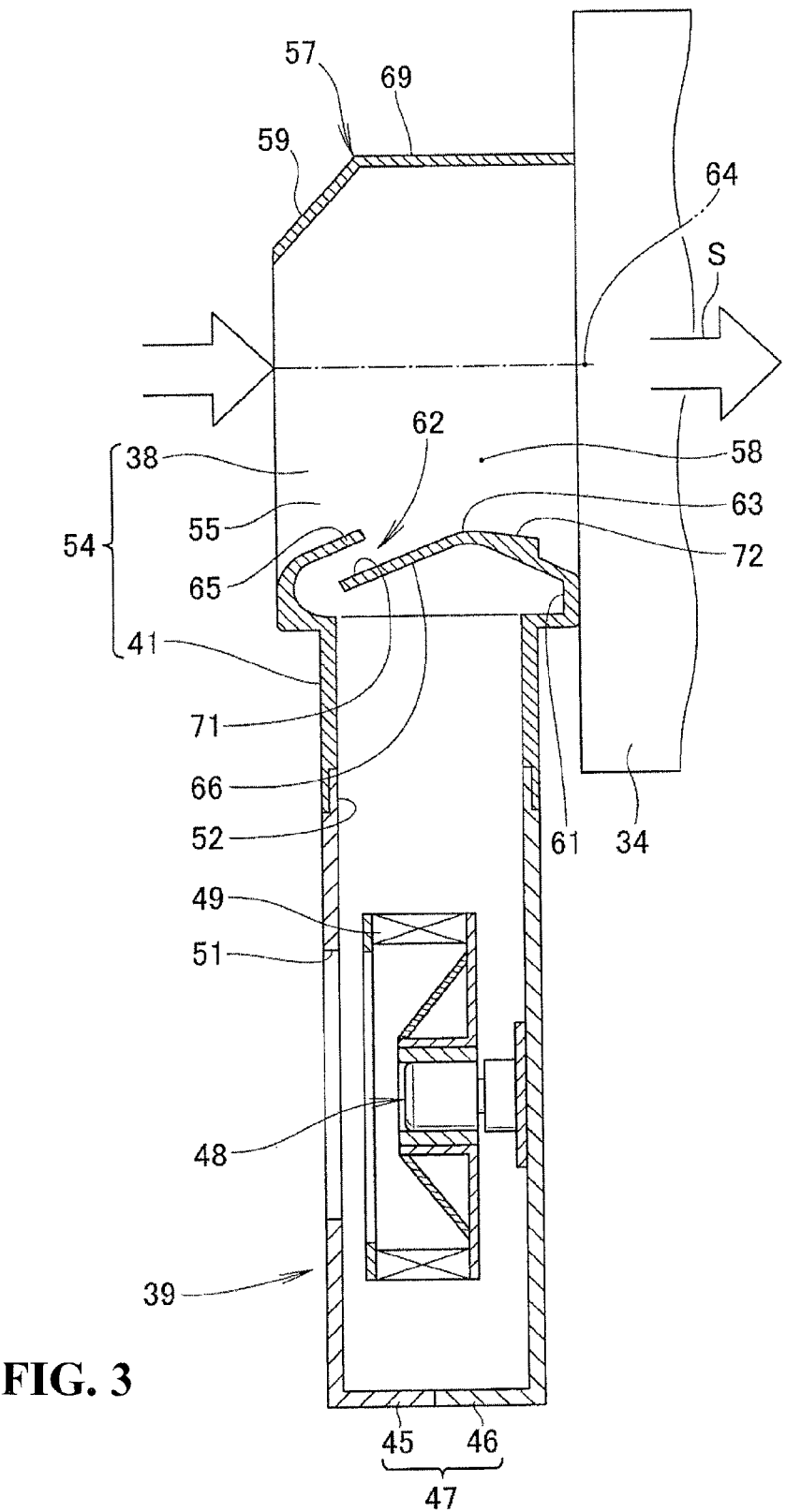
FIG. 3 is a cross-sectional view taken along line 3-3 of FIG. 2.

As shown in FIG. 3, the fan 39 includes as main elements a casing 47 configured of a front half body 45 and a rear half body 46, a motor unit 48 attached to the inner side of the casing 47, and an impeller 49 attached to and driven by the motor unit 48. An inlet port 51 for sucking in air is provided in the front half body 45 of the casing 47, and an exhaust port 52 for discharging air is provided in an upper part of the casing 47.

A baffle unit 54 is connected to the discharge port 52 of the casing 47. The baffle unit 54 is configured of the connecting duct 41 connected to the discharge port 52 of the casing 47, and the baffle member 38 connected to the downstream end of the connecting duct 41. In the example, the connecting duct 41 is formed integrally with the baffle member 38. In FIG. 3, an arrow S indicates the direction in which the air stream inside the baffle member 38 flows.

Also referring to FIG. 2, the baffle member 38 is a nozzle 55, and as mentioned earlier, the nozzle 55 has the U-shaped portion 56, and the connecting plate 57 is bridged across the left and right upper ends of the U-shaped portion 56. The connecting plate 57 has an inclined portion 59 arranged in an inclined manner such that the opening area of the air passage 58 spreads toward the downstream from the windward side and a horizontal portion 69 provided so as to be continuous with the inclined portion 59, and provided along the direction of an axis 64 of the air stream flowing through the air passage 58. Note that although the connecting plate is configured of the inclined portion and the horizontal portion in the example, it may be configured only of the inclined portion, and the horizontal portion may be omitted.

Figure 4:
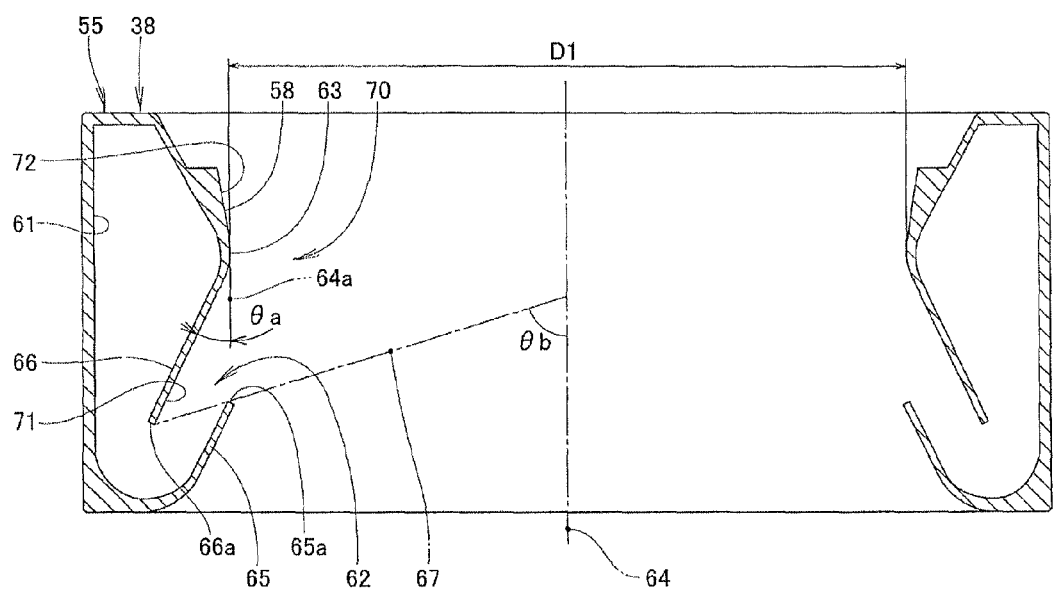
FIG. 4 is a cross-sectional view taken along line 4-4 of FIG. 2.

As shown in FIG. 4, the U-shaped portion 56 (see FIG. 2) of the nozzle 55 has an inner passage 61, and an exhaust nozzle 62 from which air inside the inner passage 61 is ejected. The nozzle 55 has a surface portion 70 including a curved surface 63 where the jet flow attracts surrounding air.

Also referring to FIG. 2, the inner passage 61 is integrally formed with the connecting duct 41, and is a space that allows air generated by the fan 39 to pass therethrough. The nozzle 55 is provided so as to form a U-shape around the axis 64, which is parallel to the direction in which the air stream passing through the radiator main body 37 flows, and the air passage 58 is formed inside the exhaust nozzle 62 in the axial direction. The air passage 58 allows the jet flow from the exhaust nozzle 62 of the nozzle 55 to flow therethrough while attracting surrounding air.

The exhaust nozzle 62 is configured of an inner wall 65, and an outer wall 66, which is provided outside the inner wall 65 with respect to the shaft center of the air passage 58 so as to be substantially parallel to the inner wall 65. An angle θa formed by the outer wall 66 and a line 64a, which extends parallel to the axis 64 of the air stream flowing through the air passage 58, is an acute angle (0<θa<90°). The outer wall 66 has a first face 71 narrowing towards the shaft center 64 of the air passage 58 as it approaches the vehicle rear, a second face 72 spaced further apart from the shaft center 64 of the air passage 58 as it approaches the vehicle rear at a position behind the first face 71, and the curved surface 63 smoothly connecting the first face 71 and the second face 72 according to a predetermined curvature R. The surface portion 70 is configured of the first face 71, the second face 72, and the curved surface 63. The angle θa formed by the outer wall 66 (or the inner wall 65 parallel to the outer wall 66) and the line 64a, which extends parallel to the axis 64 of the air stream flowing through the air passage 58, is an acute angle (0<θa<90°).

The inner wall 65 and the outer wall 66 constituting the exhaust nozzle 62 are provided substantially parallel to each other, and the angle θa formed by the outer wall 66 and the line 64a parallel to the axis 64 of the air stream is set to an acute angle (0<θa<90°). Thus, air flowing through the air passage 58 can be flow through efficiently without being diffused.

The inner wall 65 and the outer wall 66 are arranged so as to overlap each other when the air passage 58 is viewed from the direction of the axis 64 of the air stream. An angle θb formed by the axis 64 of the air stream and a line 67, which connects a tip end 65a of the inner wall 65 and a tip end 66a of the outer wall 66, is set to 60°≤θb≤90°.

By using the nozzle 55 configured of the inner wall 65 and outer wall 66 described above, the jet flow ejected from the exhaust nozzle 62 is attracted to the outward-flared second face 72 and flows along the second face 72. This phenomenon where a jet flow attaches to a nearby wall (second face 72) is referred to as the Coandă effect. The Coandă effect generates a negative-pressure area inside the second face 72. Air inside the air passage 58 is attracted to fill the negative-pressure area, whereby air passing through the air passage 58 increases. Thus, the air capacity is increased. In the present invention, the phenomenon where air passing through the air passage 58 increases, i.e., the increase in air capacity is included in the Coandă effect.

Hereinbelow, the effect of the above-mentioned cooling structure of a motorcycle will be described.

Referring to FIG. 2, the connecting duct 41 for conveying air to the baffle member 38 from the fan 39 is provided between the baffle member 38 and the fan 39. The connecting duct 41 extends substantially vertically in the height direction, and has the fan 39 connected to its lower end. Accordingly, the connecting duct 41 allows the radiator main body 37 and the fan 39 to be arranged in a spaced manner.

Conventionally, in a structure including a fan arranged close to a radiator main body, e.g., a fan arranged immediately behind a radiator main body in the vehicle, air passing through the radiator main body hits the fan blade and does not pass through smoothly, whereby the cooling efficiency is reduced. This requires measures such as an enlargement of the fan, in some cases.

Thus, in the present invention, the radiator main body 37 and the fan 39 are arranged separately. With this configuration, air passing through the radiator main body 37 does not hit the fan blade (or the "impeller 49") but passes thorough smoothly, so that a reduction in the cooling efficiency can be suppressed. Since air passes through smoothly and the cooling efficiency is improved, the fan 39 can be made smaller. In addition, since the fan 39 can be arranged separately from the radiator main body 37, the arrangement can be designed more freely.

In addition, the baffle member 38 for blowing air onto the radiator main body 37 is attached to the radiator main body 37. The capacity of air passing through the radiator main body 37 can by increased (air capacity can be increased), by attaching the baffle member 38 having the Coandă effect to the radiator main body 37.

Next, a description will be given as to how the nozzle can suck in surrounding air and increase the capacity of air passing through the air passage.

Figure 5:
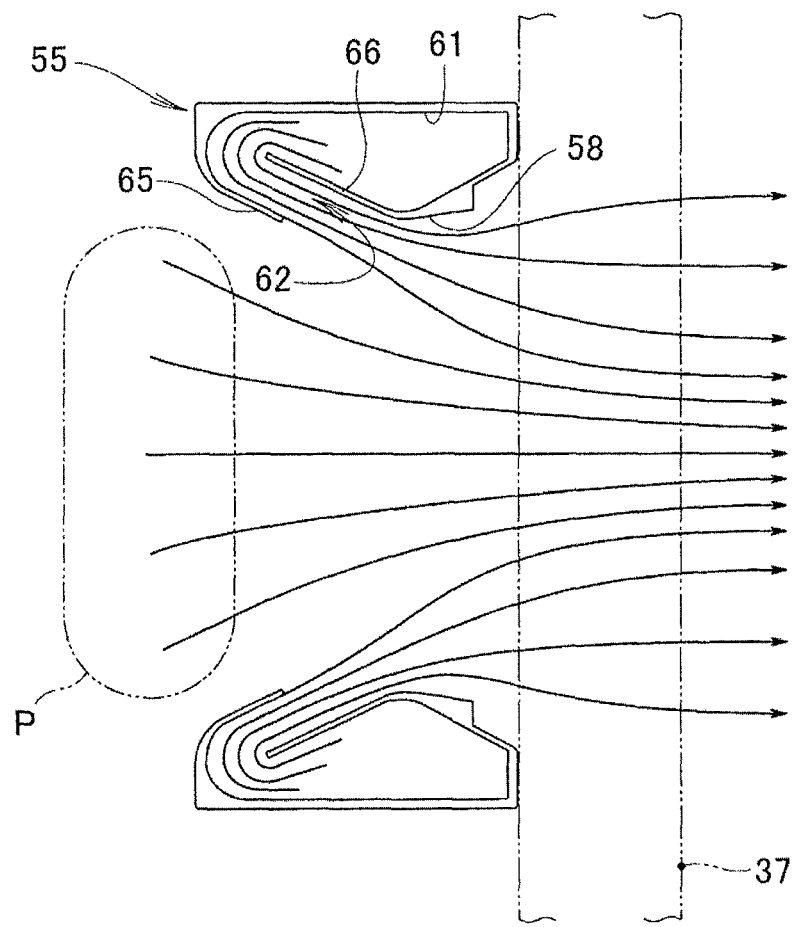
FIG. 5 is a view for explaining the effect of a baffle member included in a cooling structure according to the present invention.

As shown in FIG. 5, the nozzle 55 has the inner passage 61 and the exhaust nozzle 62, and the air passage 58 is formed inside the exhaust nozzle 62. The nozzle 55 has the Coandă effect, and air is ejected from the exhaust nozzle 62, so that surrounding air having passed through the air passage 58 is drawn in by the jet flow ejected from the exhaust nozzle 62. By drawing in the surrounding air having passed through the air passage 58, the capacity of air passing through the air passage 58 can be increased. As a result, the capacity of air passing through the radiator main body 37 (see FIG. 2) can be increased by use of the nozzle 55 having a simple shape. In FIG. 5, an arrow group P indicates the flow line of the increased capacity of air passing through the air passage 58.

Next, a description is given of how air streams interfere with one another, depending on the size of the inner diameter of the air passage provided in the nozzle.

Figure 6A:
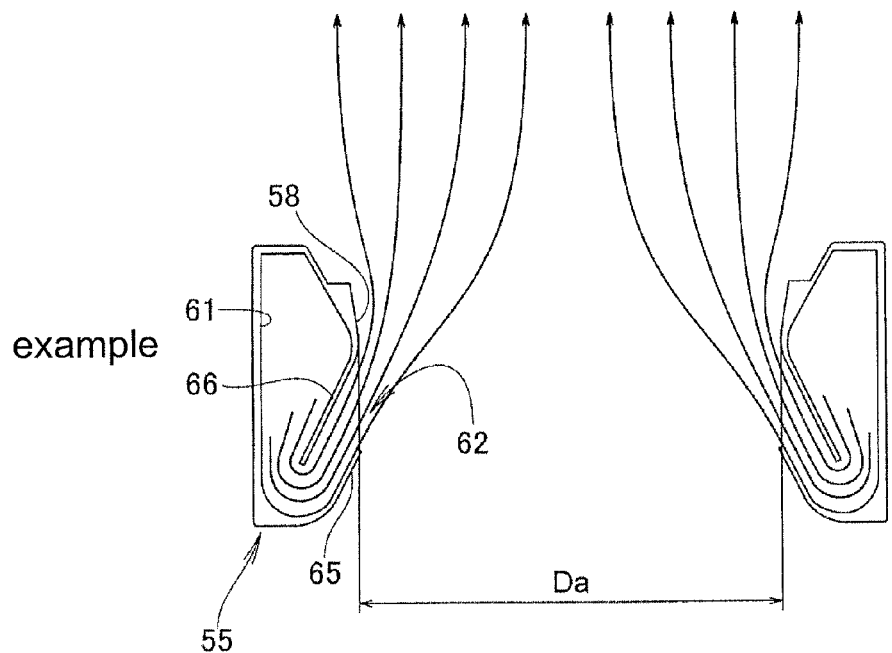
FIGS. 6(a) and 6(b) are views for explaining the effect of baffle members according to an example and a comparative example.
Figure 6B:
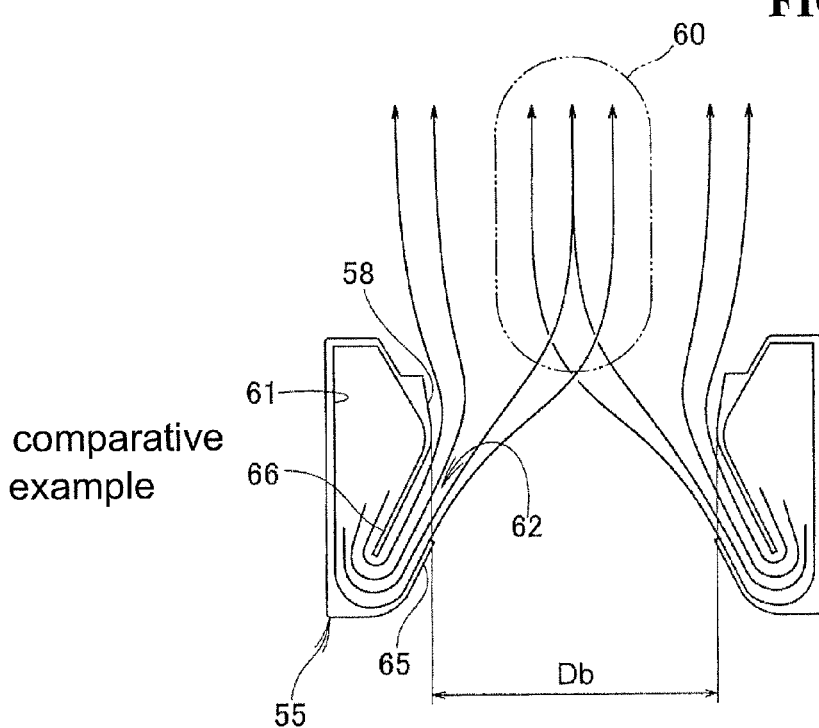

FIG. 6(a) is a view for explaining the effect of the baffle member according to the example, and FIG. 6(b) is a view for explaining the effect of a baffle member according to a comparative example.

In FIG. 6(a), an inner diameter (diameter) Da of the air passage 58 is 90 mm<Da.

In FIG. 6(b), an inner diameter (diameter) Db of the air passage 58 is Db≤90 mm.

When comparing the example of FIG. 6(a) with the comparative example of FIG. 6(b), while air streams ejected from the exhaust nozzle 62 of the nozzle 55 do not interfere with one another in FIG. 6(a), there is a region (interference portion 60) where ejected air streams partially interfere with one another in FIG. 6(b).

More specifically, in the comparative example of FIG. 6(b), when the inner diameter Db of the air passage 58 is set not longer than 90 mm, the inner diameter Db of the air passage 58 is reduced to such an extent that air streams passing through the air passage 58 interfere with one another. A region where air streams passing through the air passage 58 interfere with one another (interference portion 60) is formed, when the inner diameter Db of the air passage 58 is reduced. The capacity of air passing through the air passage 58 may be affected, when the air streams passing through interfere with one another in the interference portion 60.

Thus, in the present invention as shown in FIG. 6(a), the inner diameter of the air passage is set longer than 90 mm (90 mm<Da), so that air streams passing through the air passage 58 are allowed to flow efficiently without interfering with one another.

Next, a description will be given of details of the shape of the nozzle, and the like.

Referring to FIG. 4, the angle θb formed by the axis 64 of the air passage 58 and the line 67, which connects the tip end 65a of the inner wall 65 and the tip end 66a of the outer wall 66, is set not smaller than 60° and not larger than 90°.

If the angle θb is set smaller than 60° or larger than 90°, the effect of attracting air flowing through the air passage 58 is weakened. More specifically, the Coandă effect cannot be fully exerted.

Thus, in the present invention, the angle formed by the axis 64 of the air passage 58 and the line 67, which connects the tip end 65a of the inner wall 65 and the tip end 66a of the outer wall 66, is set not smaller than 60° and not larger than 90°. Consequently, air passing through the air passage 58 is allowed to flow more efficiently while attracting air passing through the air passage 58. Thus, the Coandă effect can be effectively exerted.

Referring to FIG. 1, the vehicle on which the cooling device 34 is mounted is a straddle type vehicle 10. In the straddle type vehicle 10, space for arranging parts is limited as compared to a four-wheeled vehicle or the like, for example.

In the present invention, the fan 39 is arranged between the frame member 11 and the cowl member 42 in the straddle type vehicle having limited mounting space. Thus, the limited space can be effectively utilized.

Referring to FIGS. 2 and 3, the nozzle 55 has the U-shaped portion 56, the connecting plate 57 is bridged across the left and right upper ends of the U-shaped portion 56, and the connecting plate 57 has the inclined portion 59, which is at least partially inclined, so that the opening area of the air passage spreads toward the downstream from the windward side. Since air flowing through the air passage 58 is guided to the air passage 58 by the inclined portion 59 of the connecting plate 57, air having passed through the air passage 58 is allowed to flow efficiently without being diffused outwardly, as compared to a case where the connecting plate is not provided. In addition, since the connecting plate is at least partially inclined, the amount of air passing through the air passage can be controlled and be set to an appropriate amount.

Next, a description will be given of a case where the air passage is formed into an annular shape.

Figure 7:
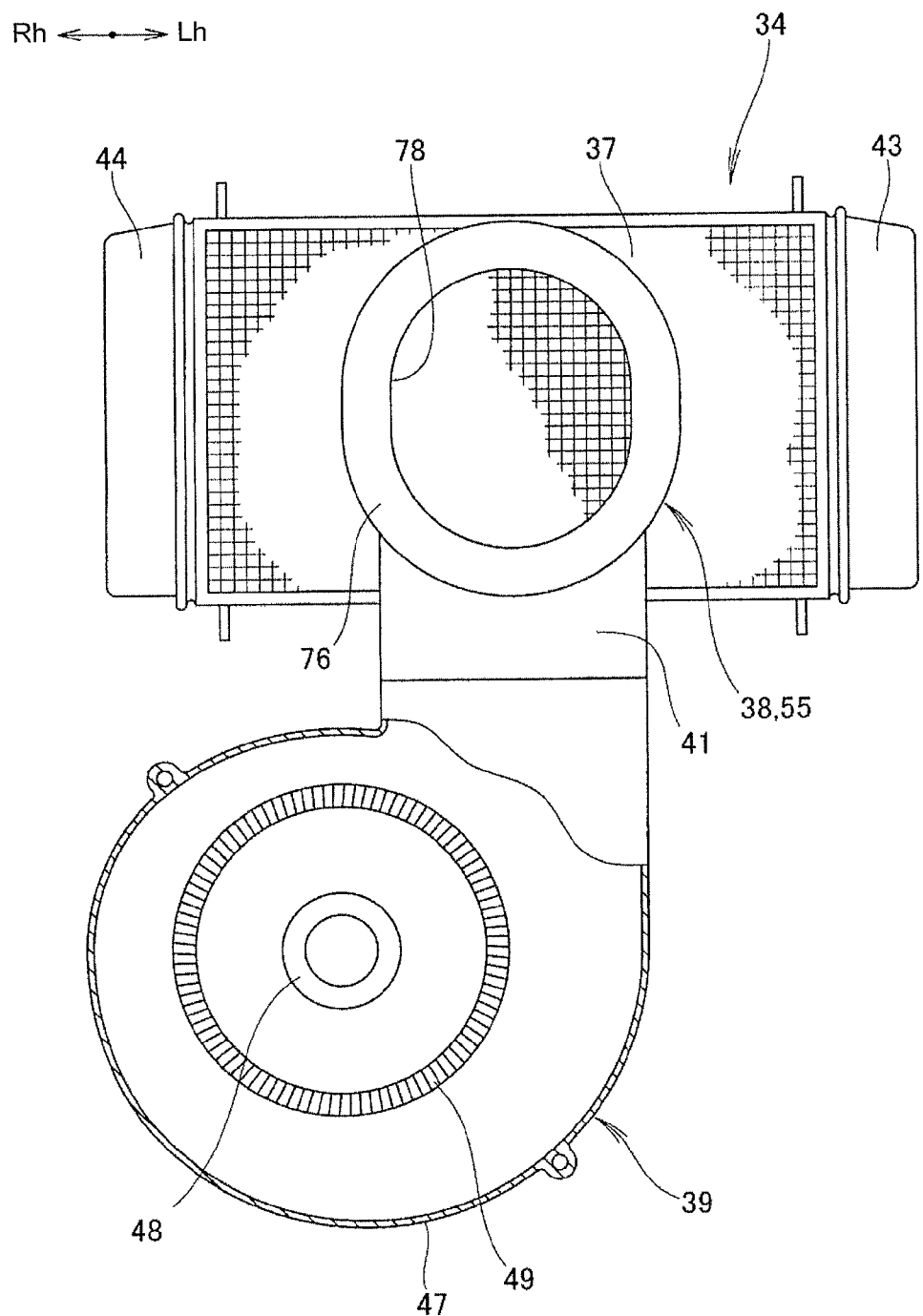
FIG. 7 is a view of another example of FIG. 2.

As shown in FIG. 7, the nozzle 55 is provided with an annular portion 76 formed around an axis parallel to the direction in which the air stream passing through the radiator main body 37 flows, and an air passage 78, which allows jet flow to flow therethrough while attracting surrounding air, is formed in the annular portion 76. Other configurations and effect of the structure having the annular nozzle, are substantially the same as the structure described in Example 1 where the air passage is formed into the U-shape and the connecting plate is bridged across the upper end portions of the U-shape, and thus descriptions thereof are omitted.

Note that although the baffle member is arranged at the vehicle front of the radiator in the example, it may be arranged at the vehicle rear of the radiator instead. In addition, although the baffle member is arranged such that the exhaust nozzle faces the radiator and blows air onto the radiator main body in the example, the baffle member may be arranged such that the exhaust nozzle faces away from the radiator so as to suck in air from the radiator main body.

Figure 8:
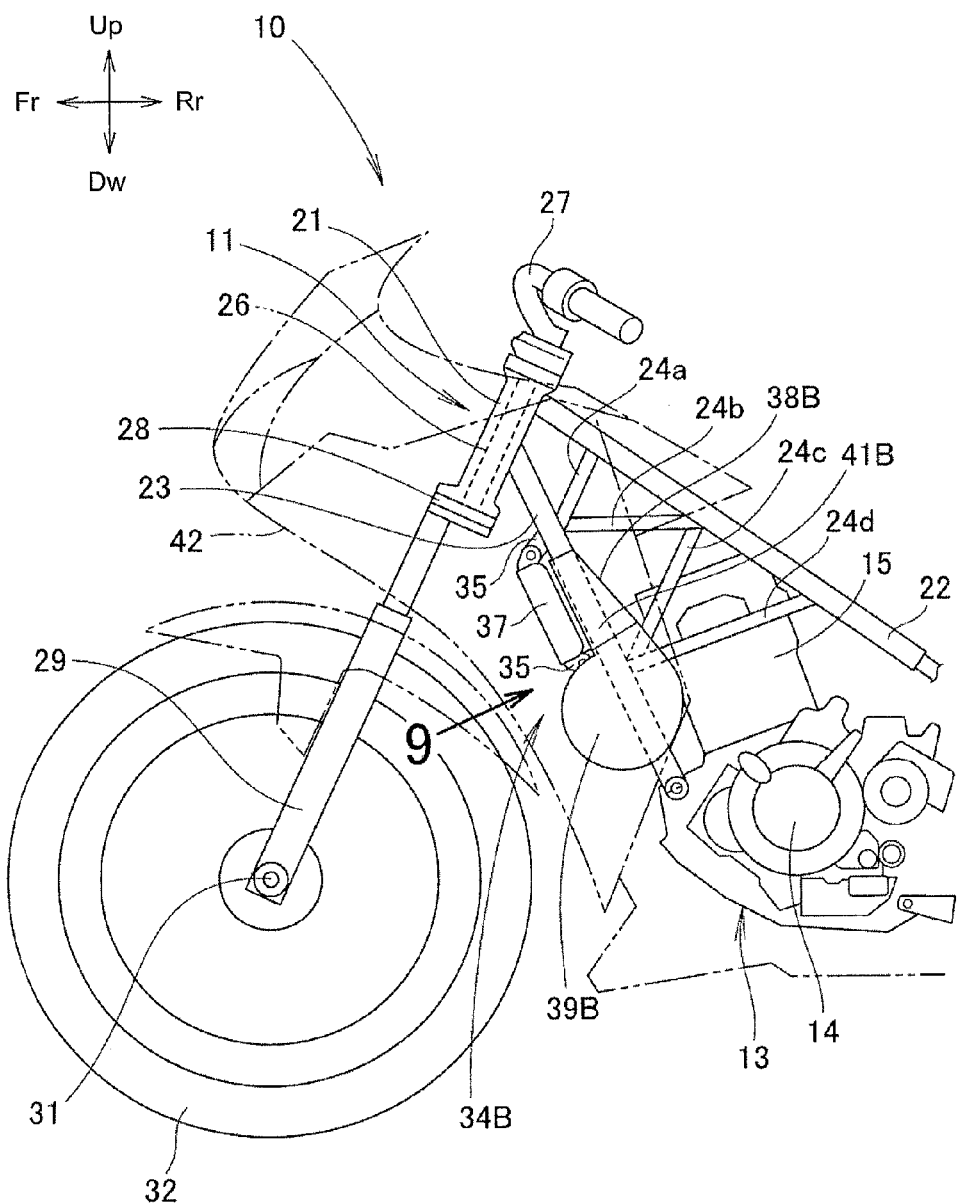
FIG. 8 is a left side view of a front portion of a motorcycle according to Example 2.

As shown in FIG. 8, a straddle type vehicle (motorcycle 10) includes a frame member 11, an engine main body 13 suspended from the frame member 11, and a cowl member 42 covering the frame member 11 and the engine main body 13. A cooling device 34B for cooling a refrigerant introduced from the engine main body 13 is attached to a down frame 23 at the vehicle front of a cylinder portion 15. The cooling device 34B includes as main elements a radiator main body 37 attached to the down frame 23 through radiator stays 35, 35, a baffle member 38B attached behind the radiator main body 37, a fan 39B arranged below the baffle member 38B, and a connecting duct 41B provided between the fan 39B and the baffle member 38B and conveying air to the baffle member 38B from the fan 39B. In addition to the frame member 11, the cooling device 34B is covered with a cowl member 42.

Figure 9:
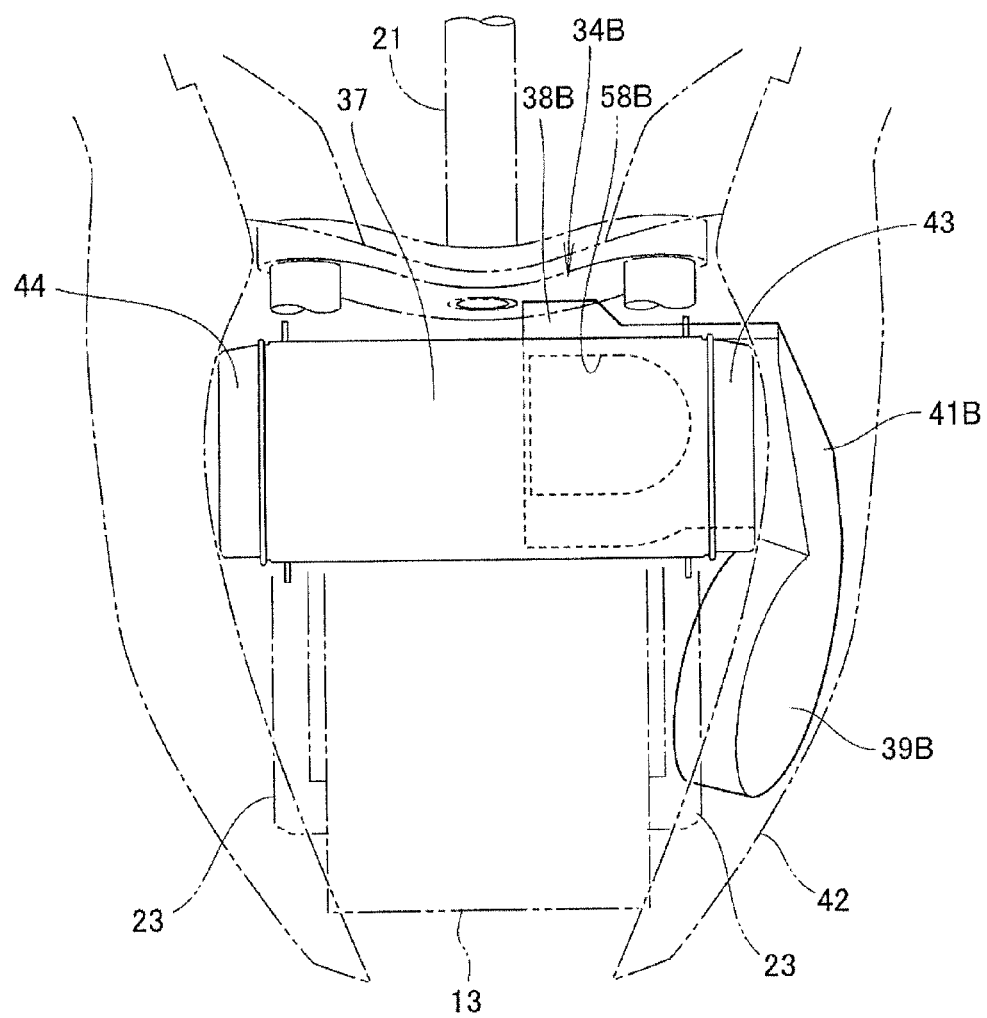
FIG. 9 is a view on arrow 9 of FIG. 8.

As shown in FIG. 9, the baffle member 38B is arranged behind the radiator main body 37. In addition, the baffle member 38B covers only the left half of the radiator main body 37 in the vehicle width direction. Moreover, in consideration of arrangement space, the fan 39B is arranged such that the direction of its rotational axis extends along the vehicle width direction. Also referring to FIG. 8, the fan 39B is arranged between the frame member 11 and the cowl member 42.

In a straddle type vehicle (motorcycle 10), space for arranging parts is limited as compared to a four-wheeled vehicle or the like.

Thus, in the present invention, the fan 39B is arranged between the down frame 23, which is a constructed of the frame member 11, and the cowl member 42 in the motorcycle 10 having limited arrangement space. Thus, the limited space can be effectively utilized.

In addition, the radiator main body 37 and the fan 39B are arranged separately, while the radiator main body 37 and the fan 39B are connected by the connecting duct 41B. With this configuration, air passing through the radiator main body 37 does not hit the blade (impeller) of the fan 39B with the air being obstructed from smoothly passing through. Thus, the cooling efficiency is not reduced.

In addition, the structures of the engine of the motorcycle and the frame member, and the configuration and effect of the cooling device are substantially the same as those with respect to FIGS. 1-7, and thus descriptions thereof are omitted.

Although the examples describe the so-called frontally-arranged radiator main body, where the radiator main body is arranged such that the flow of air passing therethrough flows in the front-rear direction of the vehicle, it may otherwise be a so-called laterally-arranged radiator main body, where the radiator main body is arranged such that a flow of air passing therethrough flows in the vehicle width direction.

Note that although the present invention has been applied to a motorcycle in the embodiment, it is also applicable to a three-wheeled vehicle, and is applicable to general vehicles.

The present invention is suitable for a motorcycle including a radiator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle cooling structure comprising:
    a radiator main body;
    a fan for conveying air to the vicinity of the radiator main body;
    a baffle member having a curved surface and being capable of sucking air from or blowing air into said radiator main body;
    a connecting duct for conveying air to the baffle member from said fan, said connecting duct being provided between said baffle member and said fan;
    said baffle member is a nozzle having an inner passage attached to said connecting duct and receiving air generated by said fan and an exhaust nozzle from which air inside the inner passage is ejected;
    said nozzle is provided in one of a U-shape and an annular shape formed around an axis, which is parallel to a direction in which the air stream passing through said radiator main body flows; and
    an air passage, which allows jet flow to flow therethrough while attracting surrounding air, said air passage being formed inside said nozzle, wherein
    said nozzle has a U-shaped portion;
    a connecting plate is bridged across left and right upper ends of the U-shaped portion; and
    the connecting plate is arranged in such a manner to be at least partially inclined, so that an opening area of said air passage spreads the downstream from the windward side.

2. The vehicle cooling structure according to claim 1, wherein the inner diameter of said air passage is longer than 90 mm.

3. The vehicle cooling structure of claim 1, wherein the baffle member is attached to the radiator main body, said radiator main body being provided for cooling a refrigerant introduced from the engine main body.

4. The vehicle cooling structure according to claim 3, wherein:
    said exhaust nozzle is configured of an inner wall, and an outer wall, which is provided outside said inner wall with respect to a shaft center of said air passage so as to be substantially parallel to the inner wall; and
    an angle ($\theta a$) formed by said outer wall and an axis of the air stream flowing through said air passage is an acute angle.

5. The vehicle cooling structure according to claim 3, wherein the inner diameter of said air passage is longer than 90 mm.

6. The vehicle cooling structure according to claim 3, wherein:
    said vehicle is a straddle vehicle;
    said straddle vehicle includes a frame member and a cowl member covering the frame member; and
    said fan is arranged between said frame member and said cowl member.

7. The vehicle cooling structure according to claim 4, wherein:
    said inner wall and said outer wall are arranged so as to overlap each other when viewed from the direction of said axis of the air stream; and
    an angle ($\theta b$)) formed by said axis of the air stream and a line, which connects the tip end of said inner wall and the tip end of said outer wall, is set not smaller than 60° and not larger than 90°.

8. The vehicle cooling structure according to claim 4, wherein the inner diameter of said air passage is longer than 90 mm.

9. The vehicle cooling structure according to claim 4, wherein:
   said vehicle is a straddle vehicle;
   said straddle vehicle includes a frame member and a cowl member covering the frame member; and
   said fan is arranged between said frame member and said cowl member.

10. The vehicle cooling structure according to claim 7, wherein:
    said vehicle is a straddle vehicle;
    said straddle vehicle includes a frame member and a cowl member covering the frame member; and
    said fan is arranged between said frame member and said cowl member.

11. The vehicle cooling structure according to claim 5, wherein:
    said vehicle is a straddle vehicle;
    said straddle vehicle includes a frame member and a cowl member covering the frame member; and
    said fan is arranged between said frame member and said cowl member.

12. A vehicle cooling structure comprising:
    a radiator main body;
    a fan for conveying air to the vicinity of the radiator main body;
    a baffle member having a curved surface and being capable of sucking air from or blowing air into said radiator main body;
    a connecting duct for conveying air to the baffle member from said fan, said connecting duct being provided between said baffle member and said fan;
    said baffle member is a nozzle having an inner passage attached to said connecting duct and receiving air generated by said fan and an exhaust nozzle from which air inside the inner passage is ejected;
    said nozzle is provided in one of a U-shape and an annular shape formed around an axis, which is parallel to a direction in which the air stream passing through said radiator main body flows; and
    an air passage, which allows jet flow to flow therethrough while attracting surrounding air, said air passage being formed inside said nozzle, wherein
    said exhaust nozzle is configured of an inner wall, and an outer wall, which is provided outside said inner wall with respect to a shaft center of said air passage so as to be substantially parallel to the inner wall; and
    an angle (θa) formed by said outer wall and an axis of the air stream flowing through said air passage is an acute angle.

13. The vehicle cooling structure according to claim 12, wherein:
    said inner wall and said outer wall are arranged so as to overlap each other when viewed from the direction of said axis of the air stream; and
    an angle (θb) formed by said axis of the air stream and a line, which connects the tip end of said inner wall and the tip end of said outer wall, is set not smaller than 60° and not larger than 90°.

14. A vehicle cooling structure comprising:
    a radiator main body;
    a fan for conveying air to the vicinity of the radiator main body;
    a baffle member having a curved surface and being capable of sucking air from or blowing air into said radiator main body;
    a connecting duct for conveying air to the baffle member from said fan, said connecting duct being provided between said baffle member and said fan;
    said baffle member is a nozzle having an inner passage attached to said connecting duct and receiving air generated by said fan and an exhaust nozzle from which air inside the inner passage is ejected;
    said nozzle is provided in one of a U-shape and an annular shape formed around an axis, which is parallel to a direction in which the air stream passing through said radiator main body flows; and
    an air passage, which allows jet flow to flow therethrough while attracting surrounding air, said air passage being formed inside said nozzle, wherein
    said vehicle is a straddle vehicle;
    said straddle vehicle includes a frame member and a cowl member covering the frame member; and
    said fan is arranged between said frame member and said cowl member.

* * * * *